United States Patent
Adams

[11] 3,777,589
[45] Dec. 11, 1973

[54] MECHANICAL DRIVE TRANSMISSION SYSTEMS

[75] Inventor: Frederick John Adams, Campton, near Shefford, England

[73] Assignee: Cam Gears Limited, Hitchin, Hertfordshire, England

[22] Filed: Sept. 1, 1971

[21] Appl. No.: 177,048

[30] Foreign Application Priority Data
Sept. 18, 1970 Great Britain.................. 44,570/70

[52] U.S. Cl....................... 74/498, 74/422, 280/96, 308/22
[51] Int. Cl............................................. B62d 3/12
[58] Field of Search................... 74/498, 422, 417, 74/423; 280/96; 308/22

[56] References Cited
UNITED STATES PATENTS

| | | | |
|---|---|---|---|
| 3,554,048 | 1/1971 | Adams | 74/498 |
| 3,630,099 | 12/1971 | Miyoshi | 74/498 |
| 3,623,379 | 11/1971 | Bradshaw et al. | 74/498 |
| 3,157,061 | 11/1964 | Parker | 74/498 |
| 3,225,230 | 12/1965 | Maffey, Jr. | 308/22 X |

FOREIGN PATENTS OR APPLICATIONS

| | | | |
|---|---|---|---|
| 539,367 | 2/1956 | Italy | 74/498 |
| 976,661 | 12/1964 | Great Britain | 74/498 |

Primary Examiner—Manuel A. Antonakas
Assistant Examiner—F. D. Shoemaker
Attorney—Hill, Sherman, Meroni, Gross & Simpson

[57] ABSTRACT

A mechanical drive transmission, especially for rack and pinion vehicle steering gear, having the drive transmitting components supported in a non-metallic molded housing which is rigid enough to maintain good bearing support of the components, resilient enough to provide good shock absorbing characteristics, and strong enough to withstand the same magnitude of shocks and loads as heretofore used metallic housings. The non-metallic housings of this invention are preferably formed by injection molding to accurate dimensions and need not be machined or threaded to properly support the drive transmitting components. Preferred materials for the housing are nylons, acrylonitrile-butadiene-styrenes, polyacetals, and polypropylenes which may be reinforced with glass fibers.

12 Claims, 3 Drawing Figures

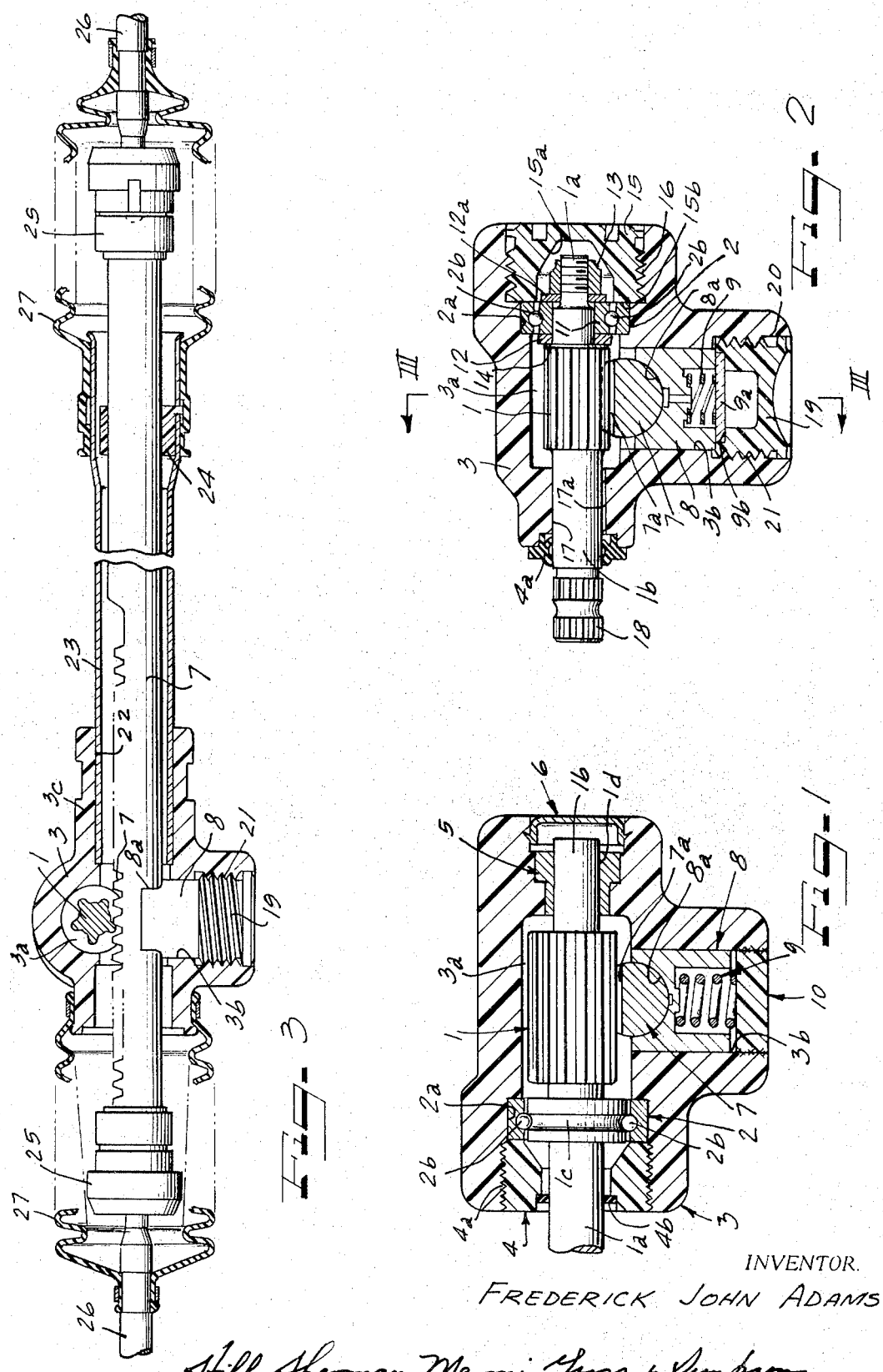

MECHANICAL DRIVE TRANSMISSION SYSTEMS

BACKGROUND OF THE INVENTION

1. Field of the Invention

This invention relates to the art of supporting and housing high load bearing constructional drive transmission parts such as those in a vehicle steering system, particularly in rack and pinion steering gear for automotive vehicles and specifically deals with molded plastic housings or casings supporting the drive components so that they will not whip or unduly flex when subjected to working stresses but will still provide enough resiliency to absorb and dissipate shock energy so that transmission of road shocks from the vehicle wheels back to the steering wheel of the vehicle will be minimized.

2 Brief Description of the Prior Art

Heretofore rack and pinion steering gear has been supported and housed in metal housings or casings and yokes or similar members of resilient material have been provided in the housings to support the components in an attempt to reduce rattle or vibration. An example of a rack and pinion transmission system incorporating such resilient members is shown in British patent 1 185 800. In the case of automobile components such as steering gears, a metal steering box is usually attached to the frame with the inter-position of a resilient member to avoid direct conduction of shock and vibration. The manufacture of conventional housings requires costly machining if the components are to be accurately mounted for cooperation. When the supporting yokes or the like are introduced into the housing, the housing is necessarily of a complex design that calls for further machining and inevitable higher production costs.

Metals commonly used for the production of components of high load bearing motor vehicle parts are of high Young's modulus and while they provide a required level of rigidity, they do not have good shock absorbing characteristics unless some load bearing components made of rubber or non-metallic substances with a low Young's modulus are incorporated. Examples of such metals have the following typical physical strength characteristics:

| Material | Young's Modulus × 10⁶ lbs. per sq. in. | tensile strength lbs. per sq. in. | elongation at break % |
|---|---|---|---|
| Steel | 29 | 125,000 | 25–30 |
| Malleable iron | 25 | 52,000 | 12 |
| Duralumin | 10 | 65,000 | 3–45 |
| Magnesium Alloy | 3–21 | 23,000–60,000 | |
| Phosphor bronze | 16 | 130,000 | 2–50 |

In mechanical drive transmission systems embodying housings or supports made of such metals, during engagement between cooperating input and output components shock forces or loads are applied to the housing either as a direct result of engagement between the components and the housing or as a result of interaction through the input and output components of the housing. As a consequence of these shocks, vibrations set up in the housing can add considerably to noise or rattle emanating from the drive transmission system and in addition, such vibration can cause wear on the housing and its components shortening the life of the system. Of course, in steering gear systems the metal housing for the drive transmitting components is not only subjected to shock loads and vibration due to the motion of the inter-engaging components, but also as a result of road vibration emanating from the steerable road wheels, abutment of the cooperating components with the metal housing, and back-lash between the cooperating components due to reaction between the road wheels and the steering wheel.

SUMMARY OF THE INVENTION

The present invention now provides a mechanical drive transmission system, particularly a vehicle steering gear, which reconciles and solves two independent problems, by providing good shock absorbing characteristics and by providing a housing which not only obviates the requirement for machining to close tolerances as heretofore been necessary but which can be produced much more economically.

The mechanical drive transmission system, such as a vehicle steering gear of this invention, has a housing of engineering plastics material enclosing and supporting cooperating metal input and output components and precluding direct metal-to-metal contact except for contact between the drive transmitting components thereby minimizing transmission of shock forces between the output and input sides of the system. A preferred steering gear of this invention is a rack and pinion steering mechanism with a housing made of an engineering plastics material having a lower order of Young's modulus than heretofore used metal parts so that its intrinsic resiliency will absorb or dampen shocks arising from wheel vibrations, back-lash and changes in direction of applied steering force. In this rack and pinion steering mechanism the rack bar carries a rack and extends through and is longitudinally movable in a housing of engineering plastics material, and a pinion is rotatably mounted in this housing in meshed engagement with the rack so that on rotation of the pinion the rack bar moves longitudinally in the housing. The pinion has a shaft extending from the housing adapted to be coupled to a rotatable steering component and the rack bar carries means by which it is adapted to be coupled to the steerable road wheels of the vehicle in which the gear is fitted.

The term "engineering plastics material" as used herein designates a plastics material which is physically strong but not too rigid so that it has enough resiliency to absorb and dissipate the shock energy to which the housing is submitted in use. One of the parameters for such materials is a Young's modulus in the middle $10^5$ to low $10^6$ lbs. per square inch, preferably in the range of $3 \times 10^5$ to $2 \times 10^6$ lbs. per square inch. Other parameters are a tensile strength preferably not less than 6,000 lbs. per square inch and an elongation at break preferably, but not essentially, greater than 5 percent. These properties should not alter unduly over a temperature range of at least −5°C. to +35°C. and preferably a range in the order of −40°C. to +100°C. The engineering plastics material of the housing may be reinforced with a filler material and a filler material of glass fiber is preferred.

Examples of "engineering plastics materials" that comply with the above requirements are as follows:

| Material | Young's Modulus × 10⁵ lbs. per sq. in. | Tensile strength lbs. per sq. in. | Elongation at break % |
|---|---|---|---|
| (unfilled) | | | |

| | | | |
|---|---|---|---|
| Nylon | 3.5 | 9,500 | 60–100 |
| ABS (acrylonitrile-butadiene-styrene) | 3.5 | 6,500 | 5–60 |
| Polyacetal (reinforced with glass fiber filler) | 5.0 | 10,000 | 25–75 |
| ABS (acrylonitrile-butadiene-styrene) | 7.0 | 8,000 | 2.5–3 |
| Polypropylene | 7.0 | 7,000 | 2.0–3.6 |
| Nylon 66 | 10.0 | 20,000 | 5.0–10 |
| Polyacetal | 10.0 | 9,000 | 2.0–7 |

The percentage elongation at break of the glass fiber reinforced materials depends to an appreciable extent on the amount of glass fiber present so that it is, in general terms, practical to control the elongation at break at the desired value by adjusting the glass fiber content. Glass fiber contents of from 20 to 40 percent by weight of the plastic are useful.

Since the engineering plastics materials listed above are thermoplastics, injection molding of the housing is a convenient method of making the housing. The housings may be molded to final dimensions to include screw threads, brackets, bearing seatings and other features facilitating assembly and mounting of the drive transmitting components. Since the housing is resilient, wider manufacturing tolerances can be accepted and of course manufacturing cost is greatly reduced. If separate covers, plugs or other closures on the body of the housing are needed they can be quickly and inexpensively permanently secured either by adhesive or welding techniques such as ultrasonic welding.

It is then an object of this invention to provide mechanical drive transmission systems with housings and bearing supports formed of engineering plastics material which eliminates direct metal-to-metal contact and minimizes shock transmission between the output and input sides of the system.

Another object of this invention is to provide a vehicle steering gear with a molded plastic housing supporting drive transmission members in a relatively rigid but somewhat resilient manner dampening road shocks without tolerating back-lash.

A further object of this invention is to provide rack and pinion steering gear for automotive vehicles with a molded plastic rack and pinion housing composed of thermoplastic materials having shock absorbing properties but being sufficiently rigid to maintain good bearing support for the rack and pinion.

A specific object of this invention is to provide rack and pinion steering gear for automotive vehicles having the rack and pinion housing composed of a molded thermoplastic selected from the group consisting of nylons, acrylonitrile-butadiene-styrenes, polyacetals, and polypropylenes.

Another object of the invention is to provide rack and pinion steering gear with a rack and pinion housing composed of a thermoplastic material having a Young's modulus in the range of $3 \times 10^5$ to $2 \times 10^6$ lbs. per square inch, a tensile strength greater than 6,000 lbs. per square inch. an elongation at break greater than 5 percent and capable of maintaining these properties throughout a wide temperature range.

Other and further objects of this invention will be apparent to those skilled in this art from the following detailed descriptions of two preferred embodiments shown on the drawings, in which:

FIG. 1 is a fragmentary cross-sectional view through a rack and pinion assembly of a rack and pinion vehicle steering gear according to this invention taken along the pinion axis in a plane normal to the rack bar;

FIG. 2 is a view similar to FIG. 1 but showing a modified embodiment;

FIG. 3 is a broken longitudinal cross-sectional view of a rack and pinion vehicle steering gear according to this invention incorporating the rack and pinion assembly of FIG. 2 and taken in the longitudinal direction of the rack bar in a plane normal to the pinion axis and along the line III—III of FIG. 2.

DESCRIPTION OF THE PREFERRED EMBODIMENTS

Referring firstly to FIG. 1, the assembly comprises a pinion 1 having integral pinion shafts 1a, 1b and an integral bearing rack 1c. The pinion is rotatably mounted in a pinion housing 3. The housing 3 is injection molded from an engineering plastics material as, for example, an acetal copolymer (such as that manufactured by Imperial Chemical Industries Limited and sold under the Trade Mark "Kemetal") to define a main chamber 3a in which the pinion 1 is located and a sub-chamber 3b. Slideably located in the sub-chamber 3b is a spring loaded yoke member 8 which is preferably of metal.

The pinion shaft 1b on the side of the pinion remote from the bearing track 1c has a plain cylindrical bearing surface 1d which is mounted to rotate in a complementary sintered metal bearing bush 5. The bush 5 has a stepped external profile and is molded in with the housing 3 so that it forms an interference fit therewith. The pinion shaft 1a is rotatably mounted in a ball roller bearing which comprises an inner race formed by the bearing track 1c (which is integral with the shaft) an outer race 2 which is split and is seated in a rebate formed by a counter bore 1a in the main chamber 3a of the housing, and by balls 1b which are located to roll in the opposed tracks provided in the inner and outer races 1c and 2. The outer race 2 is retained in its seating in the counter bore 2a by an annular plug 4 of plastics (preferably engineering plastics) material which screw threadedly engages at 4a with the housing 3 in the bore of chamber 3a. The plug 4 additionally serves to retain the pinion 1 in the housing and a seal 4b is provided between the plug 4 and the pinion shaft 1a which extends through the aperture of the plug 4. The mating screw threads on the plug 4 and housing 3 are formed by molding and, preferably, the plug 4 is spot welded to the housing after assembly. The end of the main chamber 3a remote from the plug 4 is closed by a pressed metal cap 6 having a barbed outer surface which pierces the housing material and ensures retention to the cap 6 after it has been pushed into the bore of the chamber 3a.

Extending through the housing 3 and across the pinion 1 is a rack bar 7 having a rack 7a which operatively engages in mesh with the teeth of pinion 1 in known manner. The rack bar 7 is movable through the housing on rotation of the pinion and is slideably seated in a complementary recess 8a in the yoke 8. The yoke 8 is spring loaded at 9 to bias it through the sub-chamber 3a towards the rack bar and thereby to urge the rack 7a into meshed engagement with the pinion. The spring 9 reacts between the yoke 8 and a retaining plug 10 of plastics (preferably engineering plastics) material which is located in the sub-chamber 3b. The plug 10 is positioned as required in the sub-chamber 3b and welded to the housing 3.

In the embodiment of the invention shown in FIGS. 2 and 3, (in which, for convenience, substantially the same parts or members as those shown in FIG. 1 have been accorded the same references) the pinion 1 is rotatably mounted in the main chamber 3a of the housing 3 in a ball roller bearing and in a plain bearing in a similar manner to the embodiment in FIG. 1. However, in this embodiment the ball roller bearing has an inner race 11 which comprises an annular ring member mounted on the pinion shaft 1a axially between a pair of spacer shims or washers 12 and 12a and retained by a nut 13 which screw-threadedly engaged with the end of the pinion shaft 1a. The inner race 11 is restrained from rotation on the pinion shaft 1a by tightening the nut 13 to hold the annular ring member in axial compression against a shoulder 14 forward between the pinion shaft 1a and pinion. By suitable selection of the axial thickness for the spacer shim or washer 12 it will be apparent that the pinion can be adjusted in its axial direction through the housing with respect to the rack bar 7. The outer race 2 (which in this embodiment is not split) is retained in its molded seating 2a by a plug 15 which is recessed at 15a to accommodate the nut 13 and to provide an annular end face 15b which abuts the outer race 2. The plug 15 is located in a diametrically enlarged counter bore part of the main chamber 3a and screw threadedly engages at 16 with the housing 3. Preferably the plug 15 is molded in plastics (preferably engineering plastics) materials to have its external screw thread, and the mating internal screw thread on the housing 3 is similarly formed during molding of the latter. If required the plug 15 may be retained in engagement with the housing 3 after assembly by spot welding. The end of the pinion shaft 1b extends from the housing 3 through a substantially cylindrical bore 17 of the main chamber 3a. The bore 17 provides a plain bearing surface in the engineering plastics material of the housing for the pinion shaft 1b and has an axially extending lubrication groove 17a. The outer end of the pinion shaft 1b has splines 18 by which it is intended to be coupled for rotation by a steering column of a vehicle in which the steering gear is fitted.

The assembly shown in FIGS. 2 and 3 includes the spring loaded yoke 8 which biases the rack 7a into meshed engagement with the pinion 1 but in this case the spring 9 acts against a plate 9a carried in an annular seating 9b of an externally screw threaded plug 19. The plug 19 is received within a counter bore 20 of the sub-chamber 3b to screw threadably engage at 21 with an internal screw thread on the pinion housing. The plug 19 is preferably molded in plastics (preferably engineering plastics) material to have its external screw thread and the mating internal screw thread on the housing 3 is preferably formed during molding of the housing. If required the plug 19 may be spot welded to the housing 3 to retain it in position after assembly.

As shown in FIG. 3, the rack bar 7 extends through the housing 3 to be longitudinally displaceable on rotation of the pinion 1. A tubular end part 3c of the housing 3 through which the rack bar extends is molded to have a counterbore 22 which receives a tubular extension member 23. The extension member 23 may be of metal or plastics material and is retained in the counterbore 22 by a suitable adhesive or bonding agent, (or in the case of a plastics tube 23 may be retained by welding to the housing. The end of the tubular extension 23 remote from the housing carries a bush 24 and the rack bar 7 extends both through the tubular member 23 and the bush 24 to be slideably supported by the latter. Each end of the rack bar 7 is connected through a universal coupling (shown generally at 25) to a tie rod 26. The tie rods 26 are intended to be coupled in known manner to a pair of steerable road wheels of a vehicle in which the steering gear is fitted. Two tubular flexible bellows 27 are provided which partly enclose the ends of the rack bar and extend, at one end of the rack bar, between the pinion housing 3 and the adjacent tie rod 26 and, at the other end of the rack bar, between the tubular extension 23 and the adjacent tie rod 26. The bellows 27 are sealed by clips to the components between which they extend and these bellows, together with the housing 3 and tubular extension member 23, provide a sealed chamber within which the rack bar is longitudinally displaceable and which chamber may contain a lubricant.

I claim as my invention:

1. A mechanical drive transmission system comprising intermeshed metal input and output components, a plastics material housing supporting said components for movement relative to each other and relative to the housing and out of direct metal to metal contact except at the intermesh zone between the components, and said plastics material being both rigid to support the components against the substantial flexing from intermesh relation when subjected to working stresses and resilient to absorb and dissipate shock energy and having a Young's modulus less than metal, a tensile strength not less than about 6,000 lbs. per square inch, and an elongation at break greater than about 5 percent and being inert to changes from said modulus, tensile strength and elongation over a temperature range of at least −5°C to +35°C whereby the housing is resilient to absorb shock energy imparted to the housing during use.

2. The mechanical drive transmission system of claim 1 in which the plastics material housing is molded thermoplastic material having bearing seats for the metal components.

3. The mechanical drive transmission system of claim 1 in which the plastics material housing is composed of a molded thermoplastic material having a Young's modulus in the range of $3 \times 10^5$ to $2 \times 10^6$ lbs. per square inch, a tensile strength greater than 6,000 lbs. per square inch, an elongation at break greater than 5 percent, and maintains these physical characteristics substantially constant over a temperature range in the order of −40°C to +100°C.

4. The mechanical drive transmission system of claim 1 wherein the plastics material housing is composed of a plastics material selected from the group consisting of nylons, acrylonitrile-butadiene-styrenes, polyacetals, and polypropylenes.

5. The mechanical drive transmission system of claim 4 wherein the plastics material is reinforced with glass fibers.

6. A rack and pinion steering gear assembly for vehicles which comprises a metal rack bar having a toothed rack thereon, a metal pinion meshed with the rack teeth a common housing for the rack bar and pinion having a pinion chamber and an open ended bore communicating with said chamber, bearing seats in said chamber and in said bore rotatably supporting the pinion and slidably supporting the rack bar, and said common housing providing said bearing seats being composed of a molded plastics material which is both rigid to maintain the rack and pinion in meshed engagement and resilient to dampen shock loads between the rack bar and pinion the housing composed of a plastics material having a Young's modulus in the range of $3 \times 10^5$ to $2 \times 10^6$ lbs. per square inch, a tensile strength greater than 6,000 lbs. per square inch, an elongation at break greater than 5 percent and is capable of maintaining these characteristics substantially constant over a temperature range from $-5°C$ to $+35°C$, the common housing having a resiliency effective to absorb shock energy imparted to the housing during operation of a vehicle to which the common housing is attached.

7. The rack and pinion steering gear of claim 6 having a tube secured in one open end of the bore of the housing and extending coaxially from the bore receiving the rack bar therethrough and a plastics bearing in the outboard end of said tube slidably supporting the rack bar.

8. The rack and pinion steering gear assembly for vehicles which comprises a rack bar having a rack thereon, a pinion meshed with the rack, a common housing for the rack bar and pinion supporting the rack bar in sliding relation and the pinion in rotatable relation, said common housing having a bore with an interior screw thread, a plug having an exterior screw thread in threaded engagement with the interior screw threads of the bore closing said bore and retaining said pinion in the housing, and said common housing being composed of a molded plastics material which is both rigid to maintain the rack and pinion in meshed engagement and resilient to dampen the shock loads between the rack bar and pinion.

9. A rack and pinion steering gear for automotive vehicles which comprises a molded thermoplastic housing having a pinion chamber, a rack bar chamber, and a yoke chamber, bearing seats molded in the housing at the ends of the pinion chamber, a yoke receiving surface molded in the housing in the yoke chamber thereof, plugs secured to the housing closing the ends of the pinion chamber and yoke chamber, a metal rack bar slidable through the rack bar chamber, a metal pinion rotatably mounted in said pinion chamber from said bearing seats, a yoke in said yoke chamber slidably guided on said yoke receiving surface, means in the yoke chamber urging the yoke against the rack bar, a tube secured to the housing extending from one end of the rack bar chamber and receiving the rack bar therethrough, a plastics bearing in the end of the tube remote from the housing slidably supporting the rack bar, and said thermoplastic housing being both rigid to maintain the rack and pinion in meshed engagement and resilient to dampen shock loads between the rack and pinion the housing composed of a plastics material having a Young's modulus in the range of $3 \times 10^5$ to $2 \times 10^6$ lbs. per square inch and having a resiliency sufficient to at least partially absorb shock loads imparted to the housing during operation of a vehicle to which the housing is attached.

10. The rack and pinion of claim 9 wherein at least one of the plugs is press fitted in the housing and has barbs locked in the plastic for retaining the plug.

11. The rack and pinion steering gear of claim 9 wherein at least one of the plugs is threaded in the housing an threads molded in the housing.

12. The rack and pinion steering gear of claim 9 wherein at least one of the plugs is welded to the housing.

* * * * *